(12) United States Patent
Kupratis

(10) Patent No.: US 10,174,680 B2
(45) Date of Patent: Jan. 8, 2019

(54) GAS TURBINE ENGINE WITH DISTRIBUTED FANS AND BYPASS AIR MIXER

(71) Applicant: United Technologies Corporation, Hartford, CT (US)

(72) Inventor: Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 523 days.

(21) Appl. No.: 14/687,995

(22) Filed: Apr. 16, 2015

(65) Prior Publication Data

US 2015/0361882 A1 Dec. 17, 2015

Related U.S. Application Data

(60) Provisional application No. 62/000,140, filed on May 19, 2014.

(51) Int. Cl.
*F02C 7/36* (2006.01)
*F02C 3/10* (2006.01)

(52) U.S. Cl.
CPC . *F02C 7/36* (2013.01); *F02C 3/10* (2013.01)

(58) Field of Classification Search
CPC .. F02C 3/067; F02C 3/10; F02C 3/107; F02C 7/36; F02K 3/04; F02K 3/072; F02K 3/065; F02K 3/068; F02K 3/075; F02K 3/077; F02K 3/12
See application file for complete search history.

(56) References Cited

U.S. PATENT DOCUMENTS

| | | | |
|---|---|---|---|
| 2,668,596 A * | 2/1954 | Elliott | B64D 15/04 244/134 C |
| 3,054,577 A | 9/1962 | Wolf et al. | |
| 5,161,369 A | 11/1992 | Williams | |
| 6,792,745 B2 | 9/2004 | Wojciechowski | |
| 7,107,756 B2 | 9/2006 | Rolt | |
| 7,752,834 B2 | 7/2010 | Addis | |
| 8,015,796 B2 | 9/2011 | Babu et al. | |
| 2004/0025493 A1 | 2/2004 | Wojciechowski | |
| 2008/0098719 A1 | 5/2008 | Addis | |
| 2009/0229243 A1 | 9/2009 | Guemmer | |
| 2012/0304619 A1 * | 12/2012 | Beachy Head | F01D 7/00 60/204 |
| 2013/0104523 A1 * | 5/2013 | Kupratis | F02K 3/12 60/226.1 |

* cited by examiner

*Primary Examiner* — Gerald L Sung
*Assistant Examiner* — William Breazeal
(74) *Attorney, Agent, or Firm* — Carlson, Gaskey & Olds, P.C.

(57) ABSTRACT

A gas turbine engine comprises a plurality of distributed fan rotors. A gas generator has a core fan rotor. at least one compressor rotor. at least one gas generator turbine rotor, and a combustion section. A fan drive turbine is downstream of the at least one gas generator turbine rotor. A shaft is configured to be driven by the fan drive turbine, the shaft engaging gears to drive the plurality of distributed fan rotors. The core fan rotor delivers a portion of air into the at least one compressor rotor, and a portion of bypass air into a bypass duct which bypasses the gas generator. The bypass air mixes with products of combustion downstream of the at least one gas generator turbine rotor.

10 Claims, 7 Drawing Sheets

GAS TURBINE ENGINE WITH DISTRIBUTED FANS AND BYPASS AIR MIXER

CROSS-REFERENCE TO RELATED APPLICATION

This application claims priority to U.S. Provisional Patent Application No. 62/000,140, filed May 19, 2014.

BACKGROUND OF THE INVENTION

Gas turbine engines are known and typically include a fan delivering air as bypass air into a bypass housing and further delivering air into a core engine. Air in the core engine is directed into a compressor where it is compressed. The compressed air is then delivered into a combustion section where it is mixed with fuel and ignited. Products of this combustion pass downstream over turbine rotors, driving them to rotate.

Recently, it has been proposed to increase the diameter of the fan to, in turn, increase bypass ratios, or the volume of air delivered as bypass or propulsion air compared to the volume of air delivered into the core engine. However, the ability to make this increase is somewhat limited by the packaging envelope available on an aircraft.

It has been proposed to replace a single large diameter with a plurality of fan rotors. However, the proposals for driving the plurality of fan rotors have deficiencies in general.

SUMMARY OF THE INVENTION

In a featured embodiment, a gas turbine engine comprises a plurality of distributed fan rotors. A gas generator has a core fan rotor. at least one compressor rotor. at least one gas generator turbine rotor, and a combustion section. A fan drive turbine is downstream of the at least one gas generator turbine rotor. A shaft is configured to be driven by the fan drive turbine, the shaft engaging gears to drive the plurality of distributed fan rotors. The core fan rotor delivers a portion of air into the at least one compressor rotor, and a portion of bypass air into a bypass duct which bypasses the gas generator. The bypass air mixes with products of combustion downstream of the at least one gas generator turbine rotor.

In another embodiment according to the previous embodiment, bypass air mixes with the products of combustion upstream of the fan drive turbine.

In another embodiment according to any of the previous embodiments, the core fan rotor includes a plurality of fan rotors.

In another embodiment according to any of the previous embodiments, at least one compressor rotor and at least one gas generator turbine rotor include at least two compressor rotors and at least two gas generator turbine rotors.

In another embodiment according to any of the previous embodiments, the core fan rotor rotates with an upstream one of the at least two compressor rotors.

In another embodiment according to any of the previous embodiments, the distributed fan rotors are provided with adjustable inlet guide vanes.

In another embodiment according to any of the previous embodiments, the inlet guide vanes may be adjusted to reduce a power required from the fan drive turbine to drive the distributed fan rotors.

In another embodiment according to any of the previous embodiments, a bypass ratio may be defined as a volume of air passing as bypass air compared to a volume of air passing into the at least one compressor rotor. The bypass ratio is less than or equal to about 2:1.

In another embodiment according to any of the previous embodiments, the bypass ratio is greater than or equal to about 1:2.

In another embodiment according to any of the previous embodiments, the core fan rotor includes a plurality of fan rotors.

In another embodiment according to any of the previous embodiments, at least one compressor rotor and at least one gas generator turbine rotor include at least two compressor rotors and at least two gas generator turbine rotors.

In another embodiment according to any of the previous embodiments, the core fan rotor rotates with an upstream one of the at least two compressor rotors.

In another embodiment according to any of the previous embodiments, the distributed fan rotors are provided with adjustable inlet guide vanes.

In another embodiment according to any of the previous embodiments, the inlet guide vanes may be adjusted to reduce a power required from the fan drive turbine to drive the distributed fan rotors.

In another embodiment according to any of the previous embodiments, a bypass ratio may be defined as a volume of air passing as bypass air compared to a volume of air passing into the at least one compressor rotor. The bypass ratio is less than or equal to about 2:1.

In another embodiment according to any of the previous embodiments, the bypass ratio is greater than or equal to about 1:2.

In another embodiment according to any of the previous embodiments, at least one compressor rotor and at least one gas generator turbine rotor include at least two compressor rotors and at least two gas generator turbine rotors.

In another embodiment according to any of the previous embodiments, the core fan rotor rotates with an upstream one of the at least two compressor rotors.

In another embodiment according to any of the previous embodiments, the distributed fan rotors are provided with adjustable inlet guide vanes.

In another embodiment according to any of the previous embodiments, the inlet guide vanes may be adjusted to reduce a power required from the fan drive turbine to drive the distributed fan rotors.

These and other features may be best understood from the following drawings and specification.

DETAILED DESCRIPTION

Figure 1:
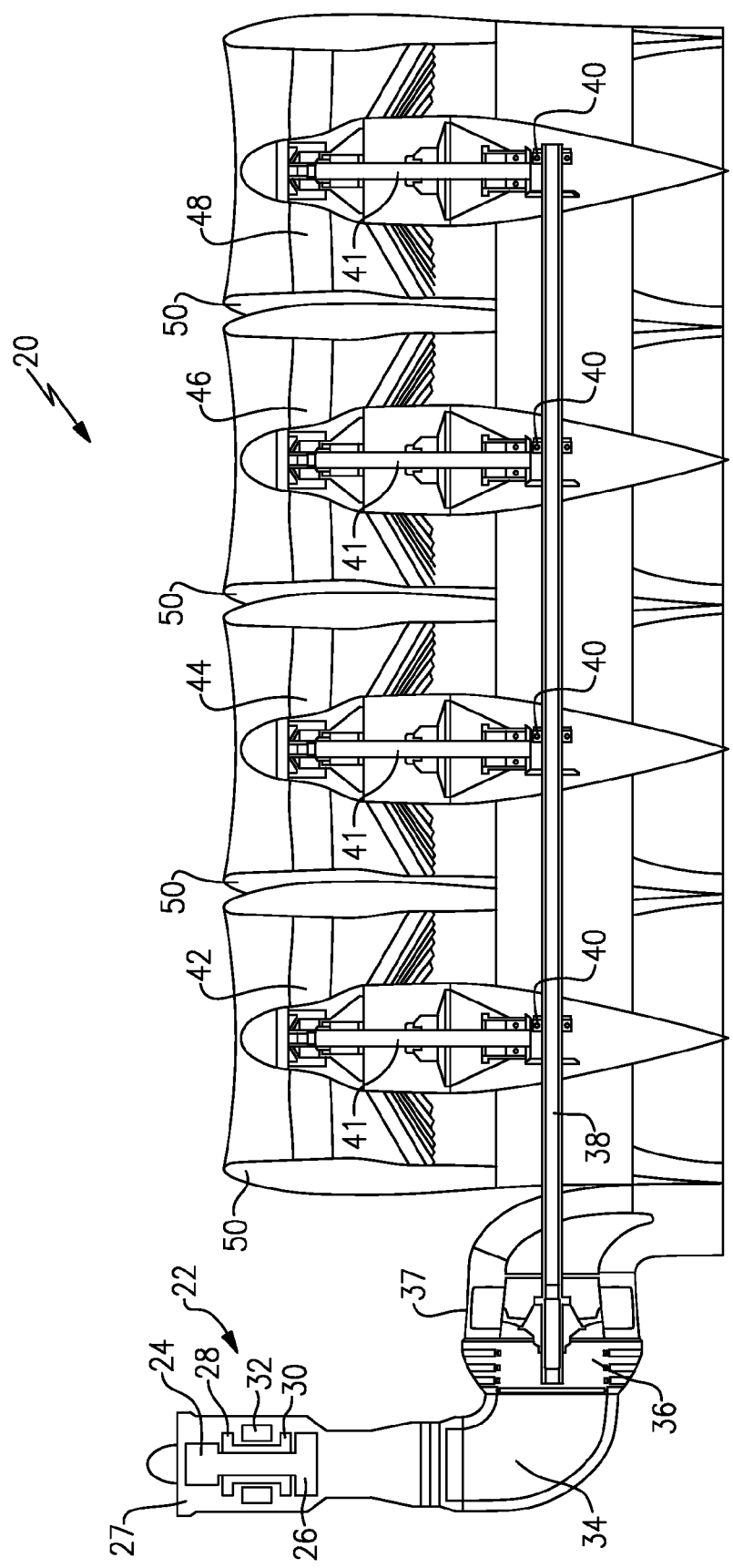
FIG. 1 schematically shows a gas turbine engine.

A gas turbine engine 20 is illustrated in FIG. 1 having a gas generator 22. The gas generator 22 may be a two spool gas generator having a low speed spool in which a first upstream compressor rotor 24 is driven by a downstream or low pressure turbine rotor 26. A high speed spool includes a high pressure compressor rotor 28 rotating with a high pressure or upstream turbine rotor 30. A combustion section 32 is positioned intermediate rotors 28 and 30.

An exhaust duct 34 is positioned downstream of the gas generator 22 and receives products of combustion which have driven the turbine rotor 26 to rotate. These products of combustion pass across a fan drive turbine 36 mounted in a housing 37. The fan drive turbine 36 drives a shaft 38 that engages a plurality of bevel gears 40 to, in turn, drive shafts 41 associated with fan rotors 42, 44, 46 and 48. Each of the fan rotors 42, 44, 46 and 48 are mounted within separate housings 50.

By providing a single shaft 38, which drives at least four fan rotors and by utilizing a fan drive turbine 36 which is positioned downstream of the last turbine rotor 26 in a gas generator 22, this disclosure provides compact packaging, while still providing adequate drive for the fan rotors 42, 44, 46 and 48.

Figure 2:
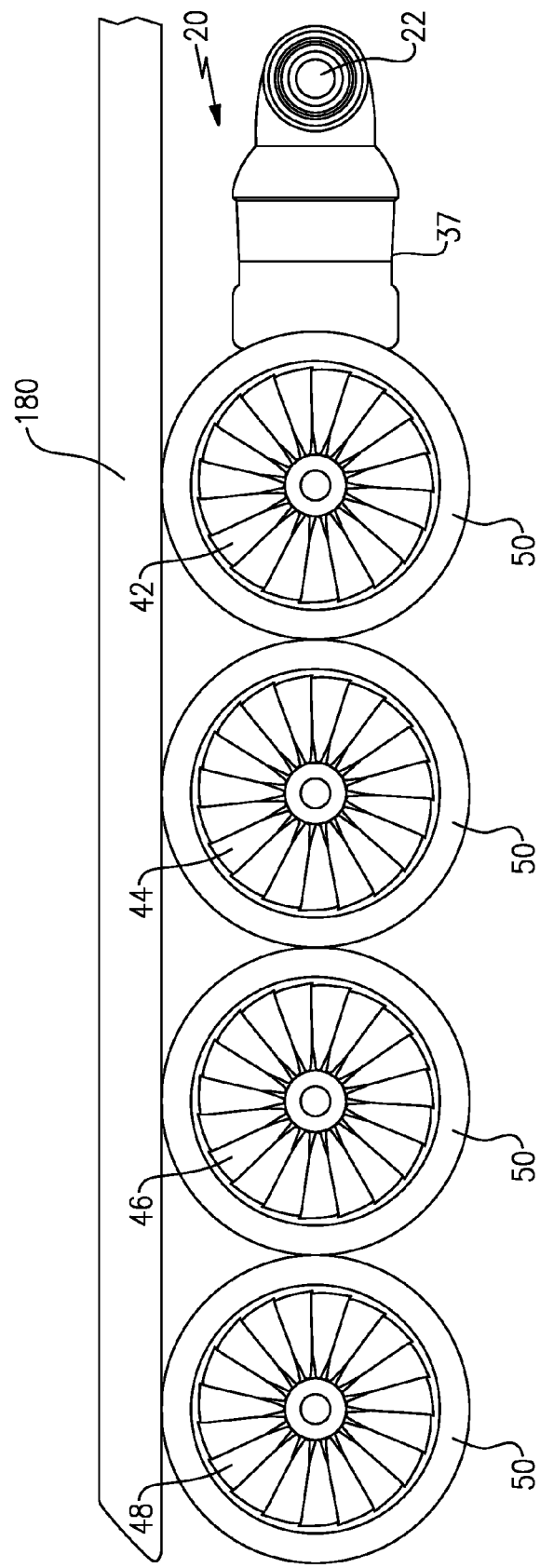
FIG. 2 is a front view of the FIG. 1 engine.

FIG. 2 is a front view of an aircraft wing 180, which may mount an engine such as engine 20. As shown, the gas generator is associated with the housing 37. The fan rotors 42, 44, 46 and 48 have diameters that are not unduly large, such that they fit within the packaging window of associated wing 180.

The engine as generally set forth above is better disclosed and claimed in U.S. Patent Application Ser. No. 61/989,675, entitled "Gas Turbine Engine With Distributed Fans," filed on May 7, 2014.

Figure 3:
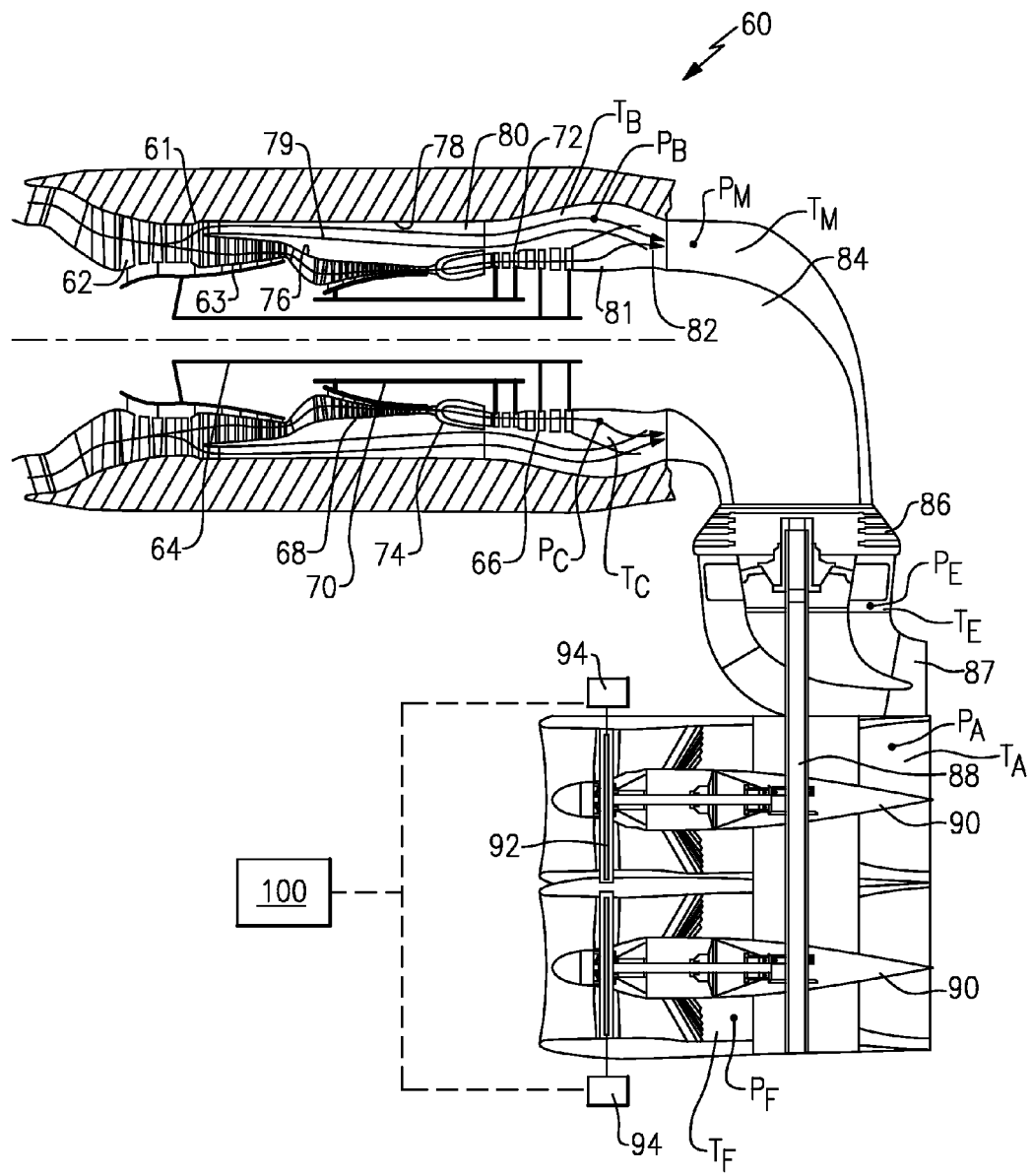
FIG. 3 shows an embodiment of this disclosure.

An engine 60 is shown in FIG. 3, which may include structure such as shown in FIGS. 1 and 2. The engine 60 includes an upstream fan rotor 62 rotating with a first compressor section 63. A downstream rotor 61 delivers air both into the compressor 63, inwardly of a housing 76, and also outwardly of the housing 76 into a bypass duct 80 defined between housings 79 and 78. The air delivered to the compressor 63 passes to a downstream compressor 68, and a combustor 74.

Products of combustion pass downstream over a turbine rotor 72 that drives a shaft 70 to drive the compressor rotor 68. Turbine rotor 66 drives a shaft 64 to drive the fan rotors 61, 62 and compressor rotor 63. Fan rotors 61 and 62 could collectively be called a core fan rotor.

The products of combustion at a location 81 inwardly of the housing 79 are hotter than the air in the bypass duct 80. The two airflows mix at a downstream end 82, pass through an exhaust duct 84, and across a fan drive turbine 86. In this manner, the temperature reaching the downstream end of the exhaust duct 84 at location 87 is at a relatively low temperature.

Since the products of combustion having just passed across the turbine rotor 66 are not mixed with any bypass airflow, they could have a high heat signature, which may be undesirable in some aircraft applications. However, by mixing this air with air from the bypass duct 80, the temperature leaving the nozzle at point 87 is a relatively lower temperature.

The fan drive turbine 86 drives the shaft 88 to drive fan rotors 90. Although two are shown, there may be three, or four, or more, as shown in the FIG. 1 embodiment.

Adjustable inlet guide vanes 92 are driven by actuators 94 controlled by a control 100. The control 100 may adjust the inlet guide vanes 94 to reduce the power required from the fan drive turbine 86 to drive the fan rotors 90. In this manner, the temperature reaching the point 87 can be controlled.

In embodiments, a bypass ratio, or the ratio of air passing into the duct 80, compared to the air passing to the compressor 63 may be between about 1:2 to about 2:1.

A pressure $P_M$ is illustrated in the FIG. 3, downstream of the point where the core and bypass flows mix. FIG. 3 also illustrates a pressure $P_E$ at the exhaust 87, downstream of the fan drive turbine 86. The fan pressure $P_F$ is also illustrated. It should be understood that $P_E$ will be less than $P_M$. Further, the exhaust temperature at location 87 is less than the temperature of the bypass air, which is less than the temperature of the mixed bypass and core air at $P_M$. As such, the air leaving the engine will be at a lower temperature than it would be without the bypass.

The temperature of the bypass air is less than the temperature of the mixed air, which is less than the temperature of the core air. The pressure of the core air may be greater than or less than the pressure of the bypass air, with the mixed air pressure being intermediate the two pressures. In a typical engine wherein the bypass providing propulsion, generally, a designer is constrained with having the bypass air at a higher pressure than the core air. However, since the bypass air here is primarily intended to mix with the core air and lower the overall temperature, this constraint is mitigated.

Figure 4A:
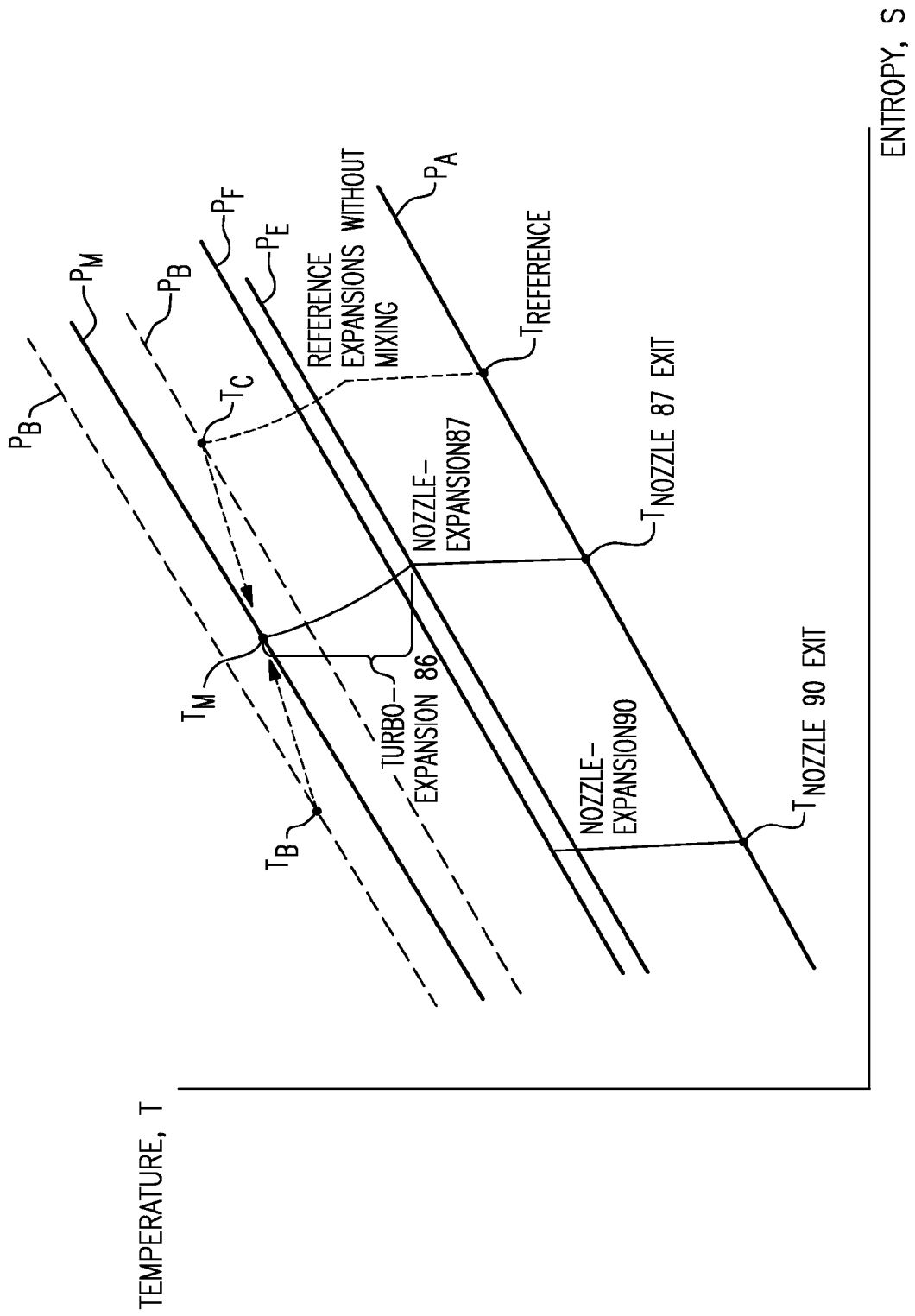
FIG. 4A shows a temperature versus entropy chart of various locations for one example engine.

FIG. 4A shows pressure graphs at lines A, B, and C. Line A is generally at location 87, line B is generally at location 90, and line C is generally at the location 86. The pressure downstream of the fan $P_F$ is preferably approximately equal to the pressure $P_E$. The temperature at the exit 90 will generally be much less than the temperature at 87. However, as shown, the temperature is lowered to the point $T_E$ from the temperature at the mixed point $T_M$, thus achieving the benefit of reducing the heat signature of the engine.

FIG. 4A shows the example engine at a condition where a bypass ratio is about 1:1, and the bypass pressure $P_B$ is greater than the core pressure $P_C$.

Figure 4B:
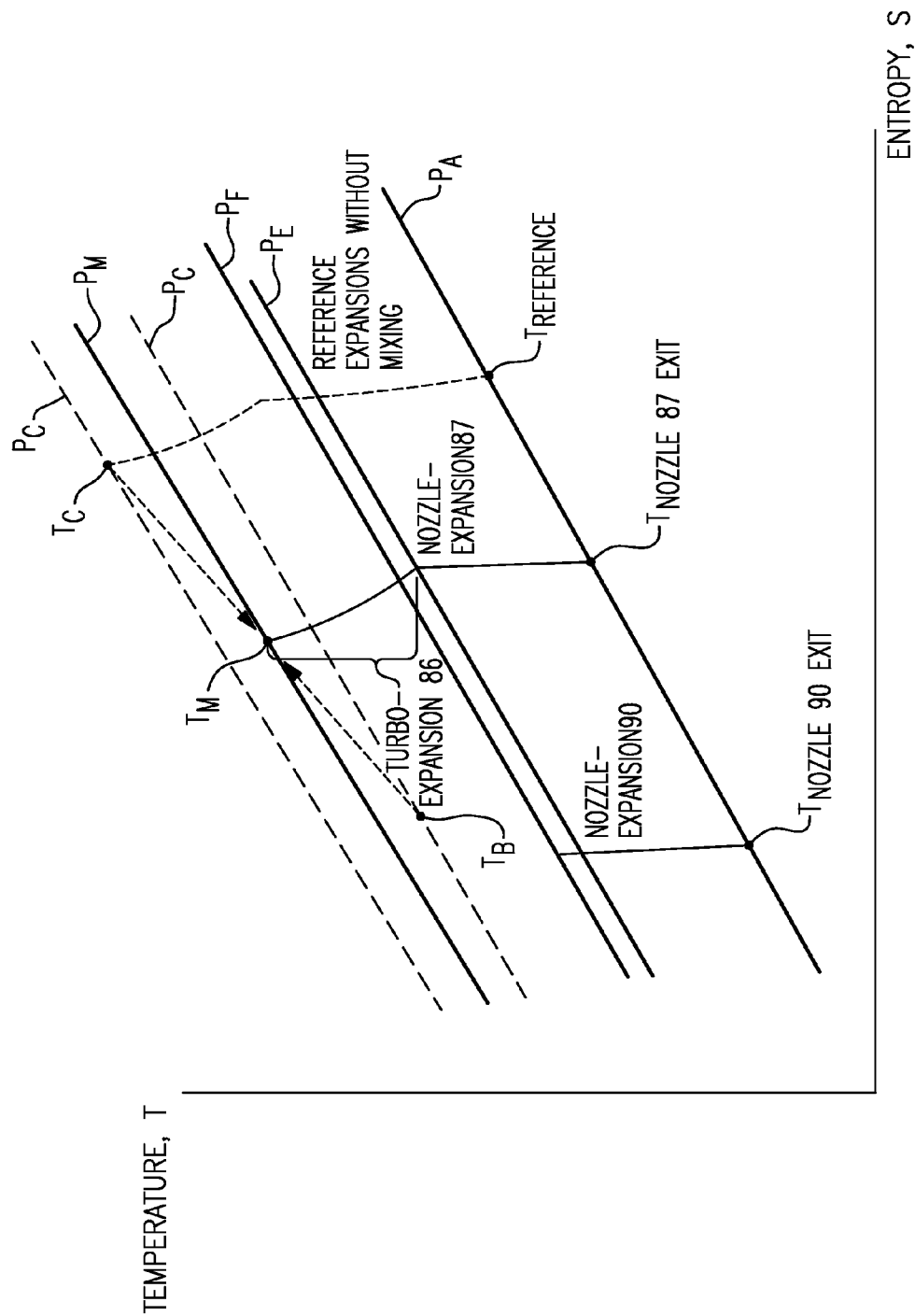
FIG. 4B shows a temperature versus entropy chart of various locations for another example engine.

FIG. 4B is a similar graph, but showing a condition where the bypass pressure $P_B$ is less than the core pressure $P_C$.

Figure 4C:
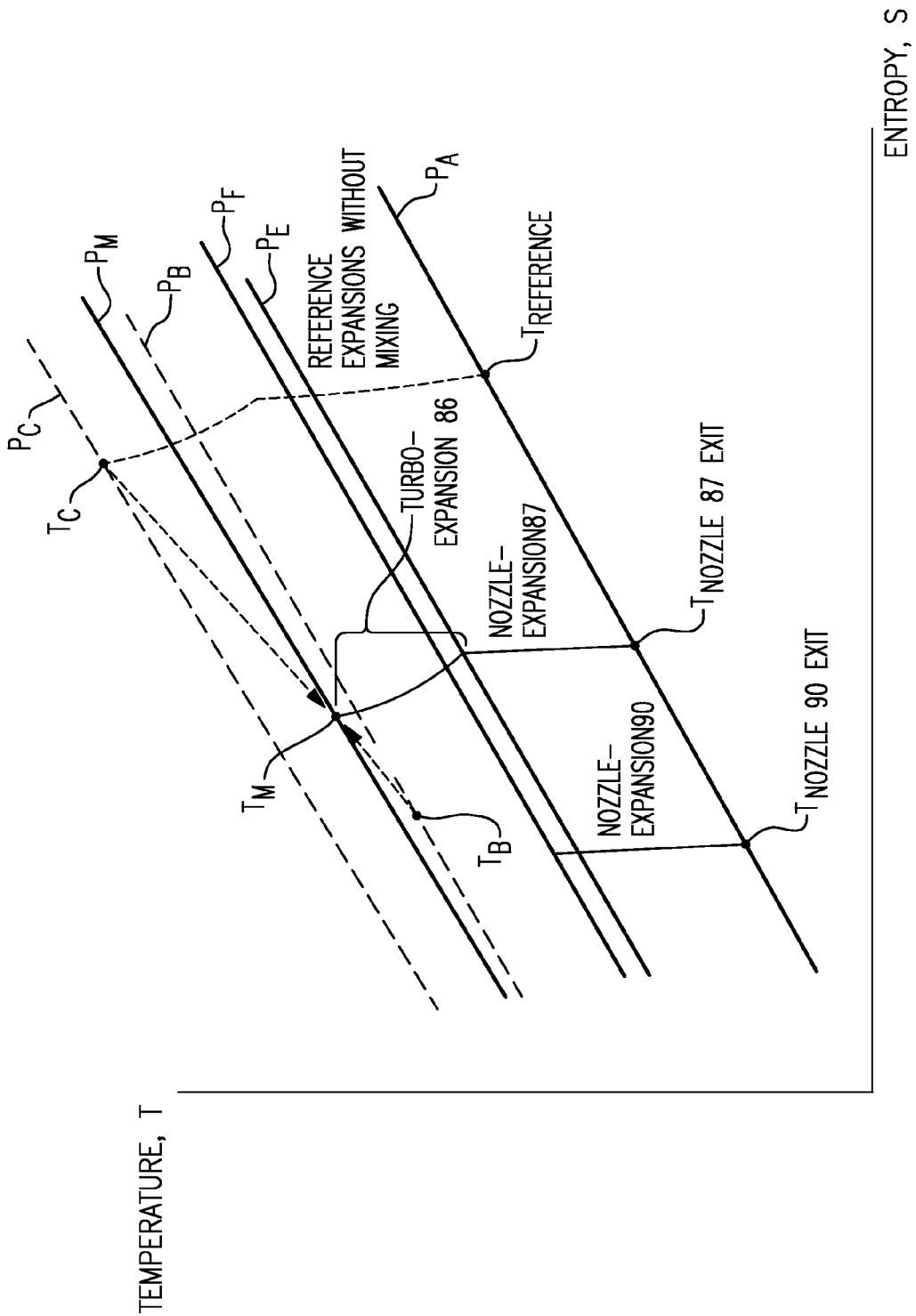
FIG. 4C shows a temperature versus entropy chart of various locations for another example engine.

FIG. 4C shows a condition where the bypass pressure $P_B$ is less than the core pressure $P_C$, and a bypass ratio is about 2:1.

Figure 4D:
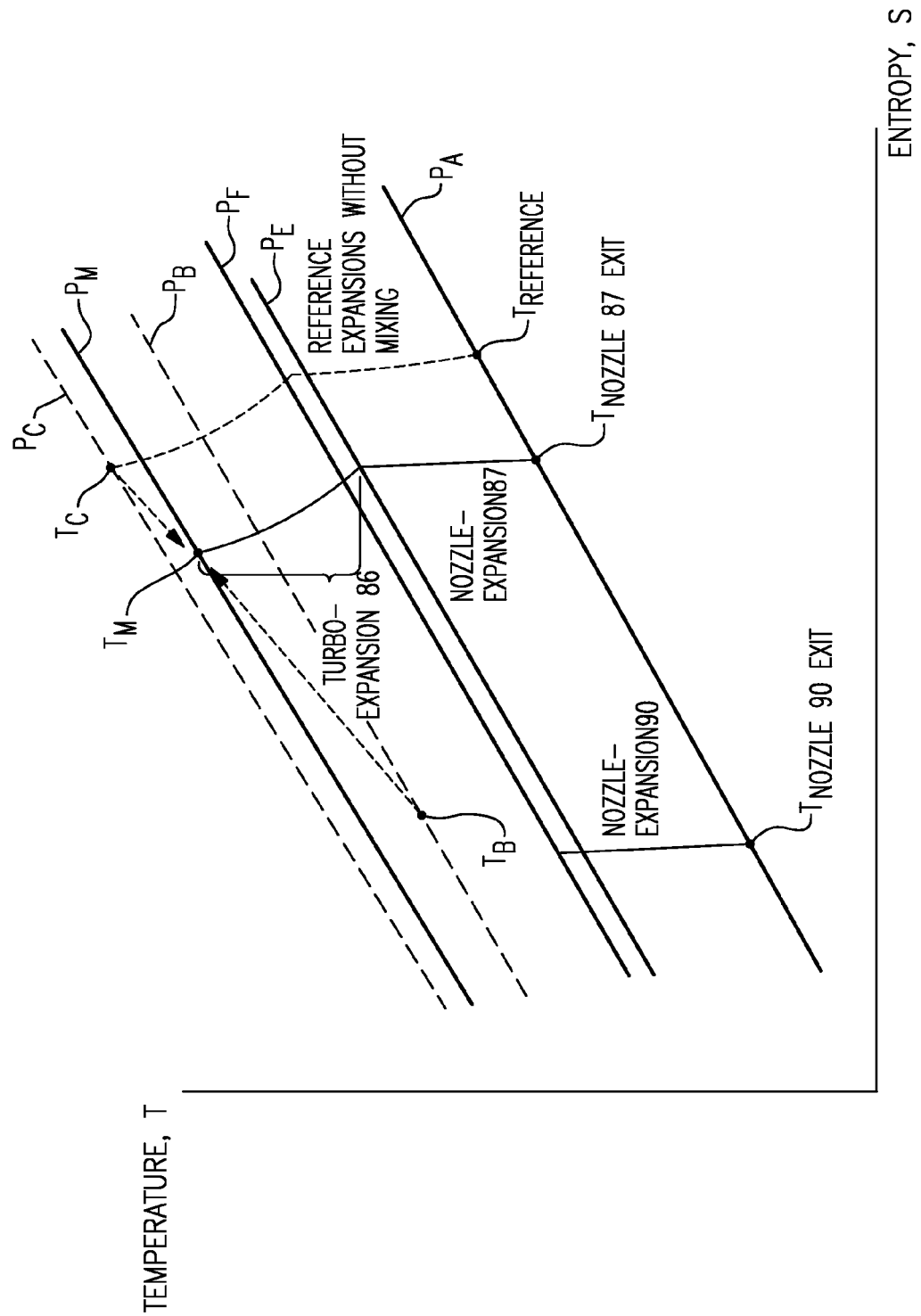
FIG. 4D shows a temperature versus entropy chart of various locations for another example engine.

FIG. 4D shows an engine wherein the bypass pressure $P_B$ is less than the core pressure $P_C$ and the bypass ratio is about 1:2.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising: a plurality of distributed fan rotors; a gas generator having: a core fan rotor; at least one compressor rotor; at least one gas generator turbine rotor; a combustion section; a far drive turbine downstream of the at least one gas generator turbine rotor, a shaft configured to be driven by said fan drive turbine, said shaft engaging gears to drive the plurality of distributed fan rotors; said core fan rotor configured to deliver a portion of air into said at least one compressor rotor and a bypass portion of air into a bypass duct which bypasses said at least one gas generator turbine rotor; and wherein said bypass duct is configured so that in an exhaust nozzle upstream of said fan drive turbine, said bypass portion of air will mix with products of combustion downstream of said at least one gas generator turbine rotor and said bypass portion of air will mix with the products of combustion upstream of said fan drive turbine, wherein the gas generator provides thrust along a thrust axis direction and the plurality of distributed fan rotors provides thrust along the thrust axis direction.

2. The gas turbine engine as set forth in claim 1, wherein said core fan rotor includes a plurality of fan rotors.

3. The gas turbine engine as set forth in claim 2, wherein said at least one compressor rotor and said at least one gas generator turbine rotor include at least two compressor rotors and at least two gas generator turbine rotors.

4. The gas turbine engine as set forth in claim 3, wherein said core fan rotor rotating with an upstream one of said at least two compressor rotors.

5. The gas turbine engine as set forth in claim 4, wherein said distributed fan rotors are provided with adjustable inlet guide vanes.

6. The gas turbine engine as set forth in claim 5, wherein said inlet guide vanes may be adjusted to reduce a power required from the fan drive turbine to drive the distributed fan rotors.

7. The gas turbine engine as set forth in claim 1, wherein said at least one compressor rotor and said at least one gas generator turbine rotor include at least two compressor rotors and at least two gas generator turbine rotors.

8. The gas turbine engine as set forth in claim 7, wherein said core fan rotor rotating with an upstream one of said at least two compressor rotors.

9. The gas turbine engine as set forth in claim 1, wherein said distributed fan rotors are provided with adjustable inlet guide vanes.

10. The gas turbine engine as set forth in claim 9, wherein said inlet guide vanes may be adjusted to reduce a power required from the fan drive turbine to drive the distributed fan rotors.

* * * * *